United States Patent
Ishikawa (10) Patent No.: US 6,788,741 B1
(45) Date of Patent: Sep. 7, 2004

(54) DEVICE AND METHOD OF RETRIEVING HIGH-SPEED MOTION

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 864 days.

(21) Appl. No.: 09/690,751

(22) Filed: Oct. 18, 2000

(30) Foreign Application Priority Data

Oct. 20, 1999 (JP) .......................................... 11-298862

(51) Int. Cl.$^7$ ............................................. H04N 7/12
(52) U.S. Cl. ............................. 375/240.16; 375/240.27
(58) Field of Search ........................ 375/240.1, 240.16, 375/240.23, 240.27, 240.24; 348/402.1, 413.1, 416.1

(56) References Cited

U.S. PATENT DOCUMENTS

| | | | | |
|---|---|---|---|---|
| 5,859,673 A | * | 1/1999 | Kobayashi et al. | .......... 348/699 |
| 6,122,317 A | * | 9/2000 | Hanami et al. | ........ 375/240.16 |
| 6,212,237 B1 | * | 4/2001 | Minami et al. | ........ 375/240.16 |
| 6,529,613 B1 | * | 3/2003 | Astle | ........................... 382/103 |

FOREIGN PATENT DOCUMENTS

| | | |
|---|---|---|
| JP | 08-32969 | 2/1996 |
| JP | 10-191352 | 7/1998 |
| JP | 10-271514 | 10/1998 |
| JP | 11-75192 A | 3/1999 |

* cited by examiner

Primary Examiner—Chris Kelley
Assistant Examiner—George A Bugg
(74) Attorney, Agent, or Firm—Sughrue Mion, PLLC (57) ABSTRACT

A high-speed motion retrieval device is provided that certainly unerring motion vector at high speed. The first-stage motion retrieval means 12 retrieves a retrieval range determined by referring to the retrieval result in the previous frame. If a minimum predictive error is smaller than a threshold value, the motion retrieval process is ended at the time the retrieval range has been retrieved. If the minimum predictive error is larger than the threshold value, the second-stage motion retrieval means 13 retrieves the region which has not been retrieved through the first-stage motion retrieval within a predetermined retrieval range, thus obtaining the location with a minimum predictive error. Thus, the retrieval is divided into two steps. Motion vectors can be retrieved with small error detection and at high speed by suitably changing the first-stage retrieval range.

16 Claims, 6 Drawing Sheets

DEVICE AND METHOD OF RETRIEVING HIGH-SPEED MOTION

BACKGROUND OF THE INVENTION

The present invention relates to a device and method of retrieving high-speed motion. More particularly, the present invention relates to a high-speed vector retrieval device that can obtain at high speed an optimum motion vector to improve the compression efficiency in a moving picture encoding device that compressive-encodes moving images.

The inter-motion-compensation-frame encoding is a procedure of retrieving the pixel value Xlm closest to Xij; from signals in the (k–1) frame to predict the pixel Xijk in k frame. Particularly, the above encoding means the procedure of searching for a block with highest correlation in block units divided every constant rectangular region. Spacial shifts |i–l| and |j–m| between Xij and Xlm are transmitted as additional information (motion vector).

Conventionally, a method of calculating a region with a highest correlation and a difference to reduce data amount to be encoded is exemplified as an effective means of improving the image quality in an image compression device that performs inter-frame-predictive encoding.

According to such a method, more widening the vector retrieval range allows accurate retrieval but the processing amount increases sharply. When a high-speed compression process is required, the operation amount is generally reduced by narrowing the retrieval range or by stopping the retrieval when correlation with a certain high level is found. This method is disclosed in JP-A No. 271514/1998 (first prior art).

However, this method has the disadvantage in that the image quality is deteriorated because the possibility is that the retrieval process is interrupted regardless of the existence of higher correlation becomes strong.

As another previous example, JP-A No. 32969/1996 (second prior art) discloses the technique of dynamically changing the retrieval range using the correlation to the same location as that in a previous frame.

In the above prior-art example, since the magnitude of movement of an image is not reflected to the retrieval range, even a region with small motion may be often retrieved broadly, so that the processing time is not always shortened. For example, in motion retrieval of a moved boundary portion of an object, the retrieval may be performed over a broader range because of low correlation to the same location in the previous frame.

As further another prior-art example, JP-A No. 191352/1998 (third prior art) discloses the technique of performing in parallel the correlation seeking process. However, this method has the disadvantage in that plural arithmetic units are required, thus resulting in an increased circuit scale. For example, this method requires plural CPUs to realize with a personal computer.

In summary, the above three prior arts have the following disadvantages.

In the first prior art, the retrieval process may be interrupted in spite of the existence of a portion with high correlation so that the image quality in degraded.

In the second prior art, because an image with large motion is not reflected to the retrieval range, even a portion with small movement may be often retrieved over a broader range, so that the processing time is not always shortened. For example, in motion retrieval of a moved boundary portion of an object, the retrieval may be performed over a broader range because of low correlation to the same location in the previous frame.

In the third prior art, plural arithmetic units are required, thus resulting in an increased circuit scale. For example, plural CPUs are required to realize with a personal computer.

SUMMARY OF THE INVENTION

The present invention is made to overcome the above-mentioned problems.

The objective of the present invention is to provide a novel motion vector retrieval device that can detect unerring motion vectors at high speed.

Another objective of the present invention is to provide a method of retrieving unerring motion vectors at high speed.

According to the present invention, a high-speed motion retrieval device comprises an compressive encoding device; the compression encoding device including image input means for receiving an image in one frame units; motion retrieval means for obtaining a correlation between a current frame and a previous frame output from the image input means; inter-block differentiating means for performing a differential operation to a block at a location corresponding to a motion vector on a reference frame, the motion vector being a vector to the location where a minimum predictive error has been obtained through retrieval of the motion retrieval means; frequency conversion means for converting block differential data obtained by the inter-block differentiating means into a frequency component; quantization means for quantizing the frequency component; and variable-length encoding means for compressively encoding a quantized output from the quantization means; the motion vector retrieval means including first-stage motion retrieval means and second-stage motion retrieval means; wherein the first-stage motion retrieval means retrieves a retrieval range to be decided by referring to a retrieval result in the previous frame, ends a motion retrieval process at the time the range has been retrieved if a predictive error is smaller than a threshold value, retrieves a region not retrieved by the first-stage motion retrieval means within a retrieval range predetermined by the second-stage motion retrieval means if the predictive error is larger than the threshold value, thus obtaining a region with a minimum predictive error, and wherein the first stage motion retrieval means performs retrieval in two steps and dynamically varies a first-stage retrieval range, thus performing motion vector retrieval with less erroneous detection at high speed.

In the high-speed retrieval device, the first-stage motion retrieval means retrieves a predetermined retrieval range without a special process since when image data is input to the image input means, it is decided whether or not retrieval information data can be referred to but the information cannot be retrieved at initial retrieval.

In the high-speed retrieval device, the threshold value comprises a retrieval result of a macroblock at the same location as that on the previous frame.

In the high-speed retrieval device, a retrieval range of the first-stage motion retrieval means is a square region of which each side has a length twice the motion vector length obtained in the previous frame.

In the high-speed retrieval device, when retrieval information can be referred to, the steps are performed of capturing information about motion vector or predictive error of a macroblock at the same location as that in said previous frame, predicting a location with a minimum predictive error by performing retrieval based on the motion vector information of said previous frame, with a retrieval start location shifted by the vector, retrieving the location with particular emphasis, and deciding a first-stage motion retrieval range based on captured vector information.

In the high-speed retrieval device, the retrieval range is a maximum or median value of a vector of an ambient block already retrieved within a frame, or a maximum or median value of each vector at the same location on past several frames, and wherein if the minimum value of a predictive error obtained over the retrieval range is smaller than a predictive error in a block at the same location on a previous frame, a retrieval process is ended, or if not, a retrieval process is continued.

The high-speed retrieval device further comprises retrieval information storage means inserted between the input of the first-stage motion retrieval means and the output of the second-stage motion retrieval means, the retrieval information storage means storing a motion vector value or a minimum predictive error value, obtained by the first-stage motion retrieval means and the second motion retrieval means, for next frame motion retrieval.

The high-speed retrieval device further comprises motion compensation means connected to the first-stage motion retrieval means and the second-stage motion retrieval means. The motion compensation means inverse-quantizes and inverse-frequency converts an output of said quantization means to convert a frequency component into an image component and then creates data about reference frame from the image component.

Figure 1:
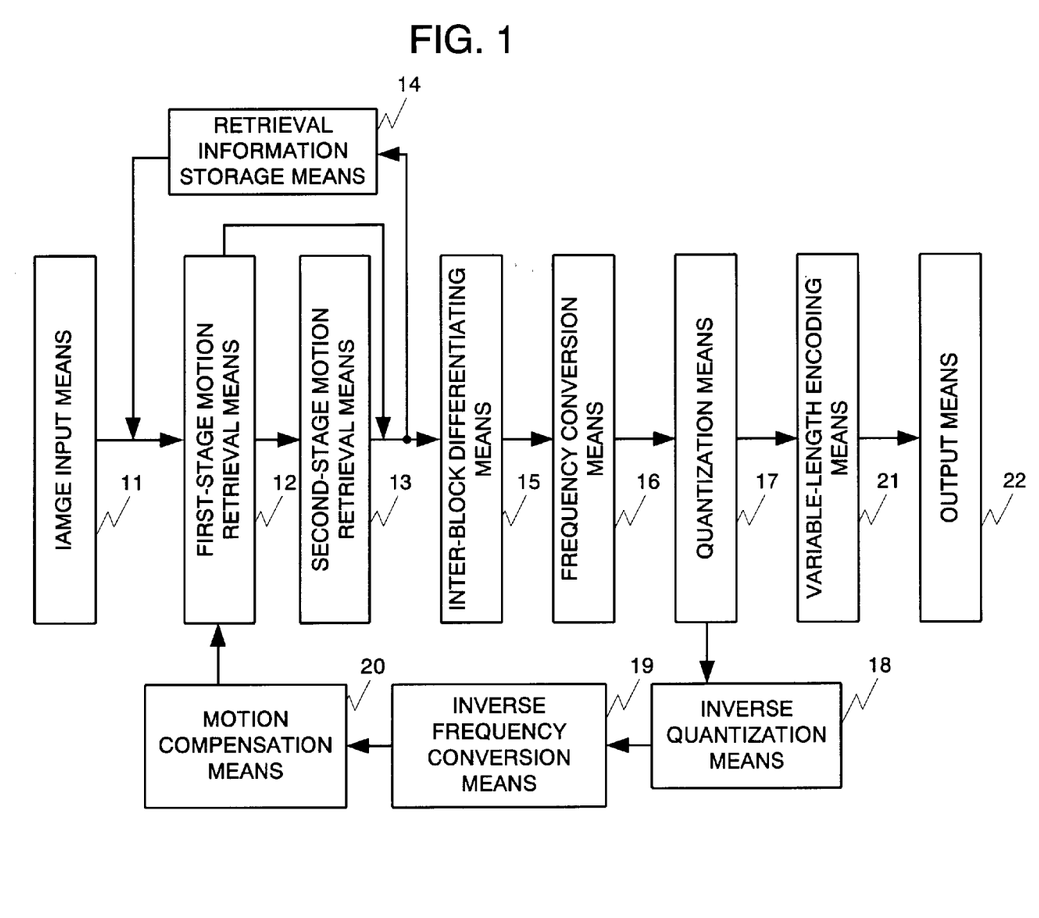
FIG. 1 is a block diagram illustrating a high-speed retrieval device according to an embodiment of the present invention?

Referring FIG. 1, the first-stage motion retrieval means 12 retrieves a retrieval range determined by referring to the retrieval result in the previous frame. If a minimum predictive error is smaller than a threshold value, the motion retrieval process is ended at the time the retrieval range has been retrieved. If the minimum predictive error is larger than the threshold value, the second-stage motion retrieval means 13 retrieves the region which has not been retrieved through the first-stage motion retrieval within a predetermined retrieval range, thus obtaining the location with a minimum predictive error.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

A preferred embodiment of the present invention will be described below in detail with reference to the attached drawings.

FIG. 1 is a block diagram illustrating a high-speed motion retrieval device according to an embodiment of the present invention.

Configuration of Embodiment

Referring to FIG. 1, a high-speed motion retrieval device consists of input image means 11, first-stage motion retrieval means 12, second-stage motion retrieval means 13, retrieval information storage means 14, inter-block differentiating means 15, frequency conversion means 16, quantization means 17, inverse quantization means 18, inverse frequency conversion means 19, motion compensation means 20, variable-length encoding means 21, and output means 22.

As for each above means, the outlines moves respectively as follows.

The image input means 11 receives images from, for example, a camera every frame. The first-stage motion retrieval means 12 obtains the correlation between a current frame and a previous frame stored as reference frames in the motion compensation means 20. In this case, the retrieval range is a square region of which each side has a length twice the length of a motion vector obtained in the previous frame. If a minimum predictive error obtained through retrieval over the retrieval range is smaller than a predictive error to a retrieval result of a macroblock (encoding block unit) at the same location as that in the previous frame, the second-stage motion retrieval means 13 does not perform the retrieval operation. Using as a motion vector the vector value to the location with a minimum predictive error, The inter-block differentiating means 15 performs a differential operation to the block at the corresponding location in the reference frame.

If a minimum predictive error obtained by the first-stage motion retrieval means 12 is larger than a predictive error to a retrieval result of a macroblock at the same location as that in the previous frame, the second-stage retrieval means 13 retrieves the region which is within a predetermined retrieval range and which has been not retrieved by the first-stage retrieval motion means 12. A vector, which reaches the location where the minimum predictive error, is obtained is defined as a motion vector. The inter-block differentiating means 15 performs a differential operation to the block at the corresponding location of the reference frame.

The motion vector value currently obtained for the next frame motion retrieval and a minimum predictive error value are stored into the retrieval information storage means 14.

The frequency conversion means 16 converts the obtained block differential data into a frequency component. The quantization means 17 quantizes the frequency component. The variable-length encoding means 21 encodes the quantized data into a compressed code and then outputs it to the output means 22.

In order to create a reference frame for next frame compression, the inverse quantization means 18 inverse quantizes the result of the quantization means 17. The inverse frequency conversion means 19 converts the frequency component into an image component. The motion compensation means 20 creates data for the reference frame.

Operation of Embodiment

Next, the operation of the embodiment will be described with reference to the attached drawings.

Figure 2:
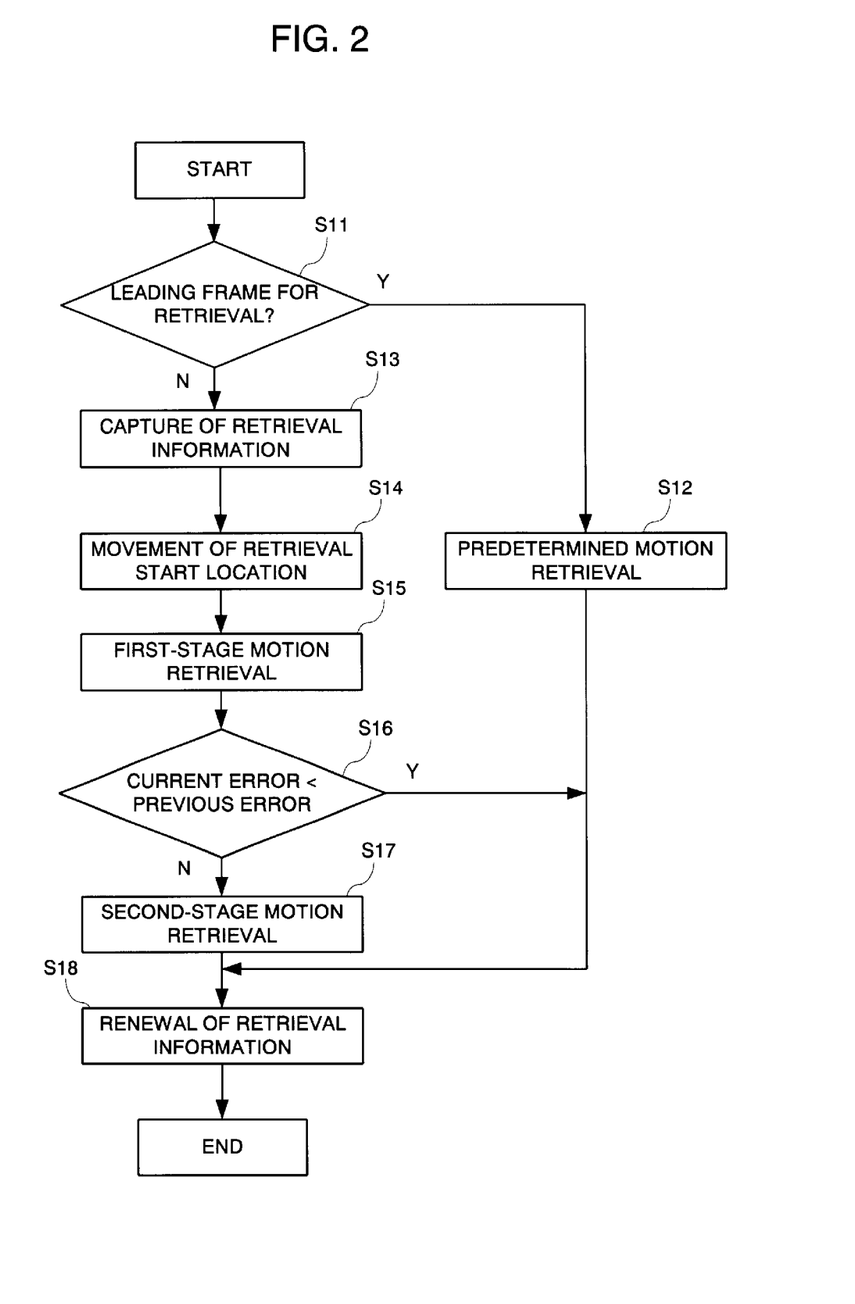
FIG. 2 is a flowchart illustrating an operation of the high-speed retrieval device according to an embodiment of the present invention??

FIG. 2 is a flowchart illustrating the operational flow of the embodiment of the present invention.

Referring to FIG. 2, when image data is input, it is ensured whether or not retrieval information data can be referred to (Step S11).

Since the information cannot be referred to through the initial retrieval, a predetermined retrieval range is retrieved without a special process (Step S12).

When the information can be referred to, information about the motion vector or predictive error of a macroblock at the same location as that in the previous frame is captured (Step S13).

Since the direction of motion scarcely changes abruptly, the retrieval is performed based on information about the motion vector in the previous frame, with the retrieval start location shifted by a vector component. Thus, the location where the predictive error is minimized is predicted and the retrieval is performed with an emphasis on the location (Step S14).

The retrieval range to be detected by the captured vector information is determined. The retrieval range is set to a length twice the vector length. Thus, the first-stage retrieval is performed (Step S15).

Now, the vector information at the same location as that in the previous frame has been used to determine the retrieval range. However, the vector information may be the maximum or median value of the vector of an adjacent block already retrieved within the same frame, or may be the maximum or median value of the vector at the same location in past several frames. If the minimum predictive error value obtained over the retrieval range is smaller than the predictive error of the block at the same location as that in the previous frame, the retrieval process is terminated. If not so, the retrieval process is continued (Step S16).

When the decision is continues retrieval, the second-stage retrieval process is performed (Step S17).

The retrieval is performed within a predetermined retrieval range. Retrieval is made to regions not retrieved in the first-stage retrieval process. If the result is smaller than a predictive error obtained through the first-stage retrieval, the vector value is updated. If not so, the first-stage retrieval result is determined as a vector value of the current macroblock.

Since the vector value and the predictive error value obtained in the above process are referred to in the next frame retrieval, they are temporarily stored in the storage area (Step S18).

Next, the embodiment of the present invention will be explained below.

Particularly, MPEG (Moving Picture Experts Group) will be explained here.

The frame configuration of MPEG1 will be explained with reference to FIG. 3.

Figure 3:
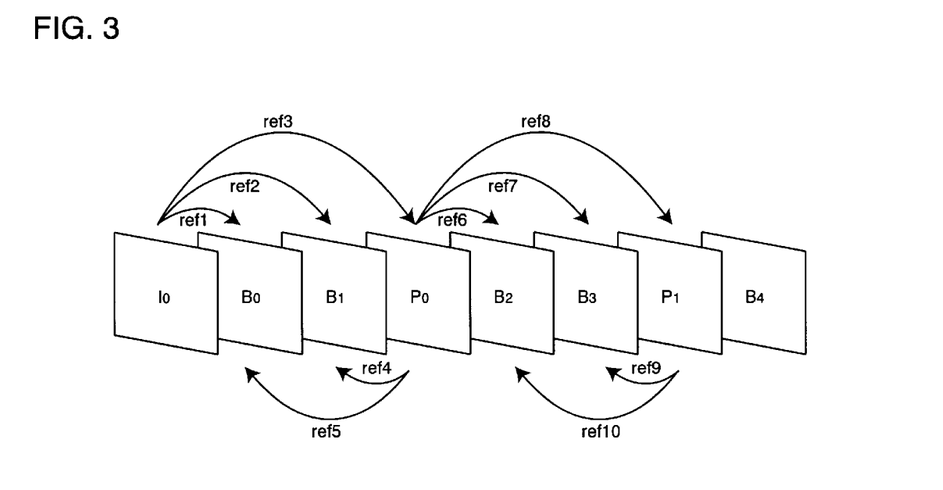
FIG. 3 is a diagram illustrating the frame configuration of MPEG1 used in the present invention.

Referring to FIG. 3, there are three frame types—I frame which is not subjected to prediction, P frame which is predicted based on past information, and B frame which is predicted based on past and future information.

In this example, a minimum number of frames needed for compression is four. Four frames ranges a frame acting as a reference frame to the next reference frame, that is, is represented as IBBP or PBBP.

In consideration of the reference direction and order, ref1 cannot capture a retrieval result because of no reference result of a previous frame, but retrieves a predetermined range. Ref2 determines and retrieves a retrieval range and a threshold value at the first stage, based on the retrieval information in ref1. Similarly, Ref3 performs retrieval based on retrieval information in refe2.

In the case of ref4, since a predetermined range is retrieved because of no information about which P0 is predicted based on B2. Ref5 performs retrieval based on retrieval information in ref4.

Ref6 uses the predictive error information in ref4 without any change. The vector information can be referred to without any change but the inverted direction of the vector information is inverted. Since Ref9 cannot obtain reference information because of the same reason as that in ref4, a predetermined retrieval is performed.

Figure 4:
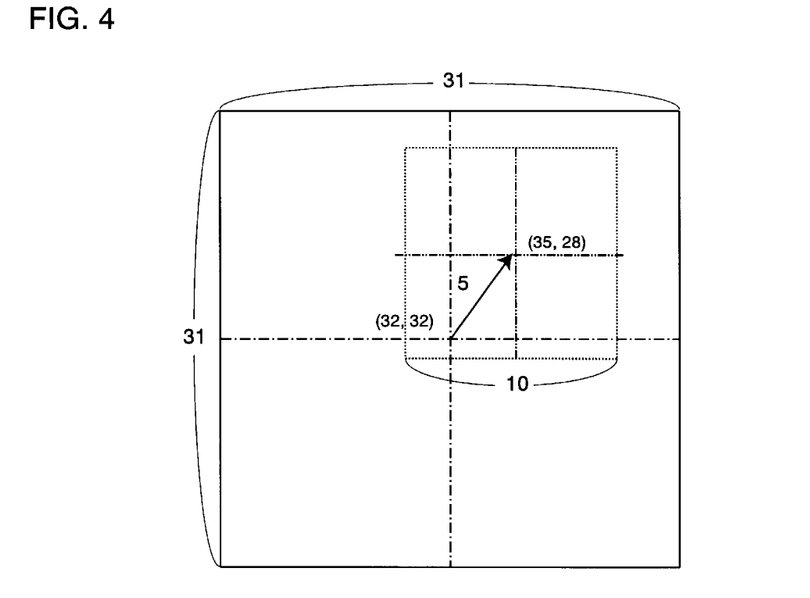
FIG. 4 is a diagram explaining the retrieval method according to the present invention.

FIG. 4 is a diagram illustrating the motion retrieval method.

Next, the motion retrieval method will be explained below by referring to FIG. 4. In the motion vector retrieval is generally the scheme of obtaining a macroblock differential between reference frames in a square region of 16×16 and determining as a predictive error an absolute value sum or square sum of differential values and obtaining a block in which the predictive error is minimized. The predetermined retrieval range covers −15 to +15 in the horizontal axis and −15 to +15 in the vertical axis.

In the first-stage retrieval, the vector of the macroblock at the same location as that in the previous frame is referred to and the retrieval start point is moved by the vector component. In this case, the start point is moved to the predictive center by predicting that vectors at the same location between adjacent frames are not often change sharply. For this reason, the possibility that vectors are erroneously detected tends to be low even in a narrowed retrieval range.

If the current location is (32, 32) and the reference vector is (3, −4), the retrieval location becomes (35, 28). Since the retrieval range is determined based on the reference vector length, the first-stage retrieval range covers −5 to +5.

Here, the vector length is used for the retrieval range without any change. The vector length plus 10% may be used as the retrieval range. Referring to FIG. 4, the region surrounded with dotted lines is subjected to the first-stage retrieval. The region surrounded with solid lines is a predetermined retrieval range. The region surrounded with dotted lines and solid lines is subjected to the second-stage retrieval.

Figure 5:
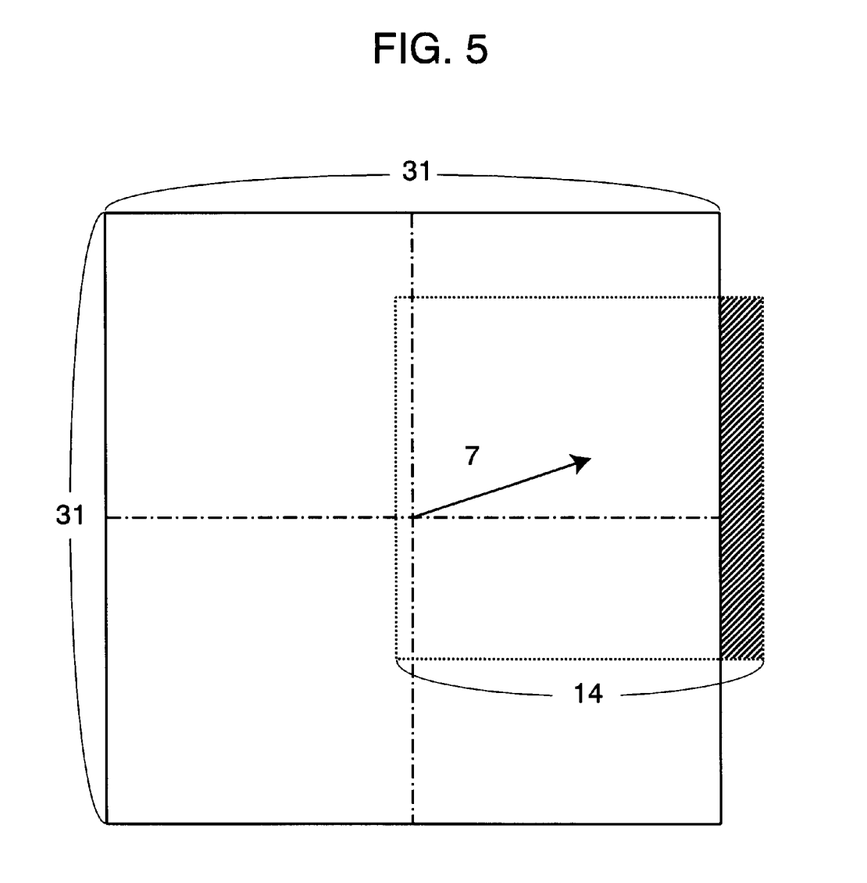
FIG. 5 is a diagram explaining the retrieval method according to the present invention.

If the first-stage retrieval is performed out of the predetermined retrieval range as shown in FIG. 5, the predetermined region is preferentially subjected to retrieval. The region that extends off the predetermined retrieval region is not retrieved.

Figure 6:
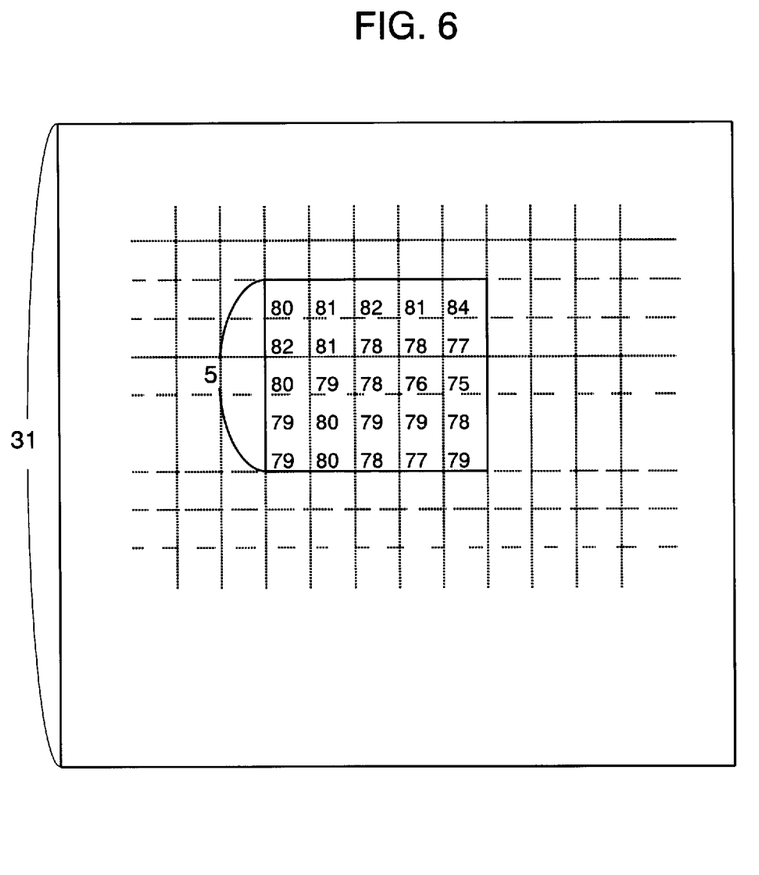
FIG. 6 is a diagram explaining the retrieval method according to the present invention.

It is assumed that even if the reference predictive error is 80, the first-stage retrieval results in the predictive error, as shown in FIG. 6. In this case, since the minimum predictive error value 75 is less than the reference predictive error value 80, the retrieval process is ended without performing the second-stage retrieval. Then, the prediction error of the macroblock is saved as 75 for the next frame reference.

Figure 7:
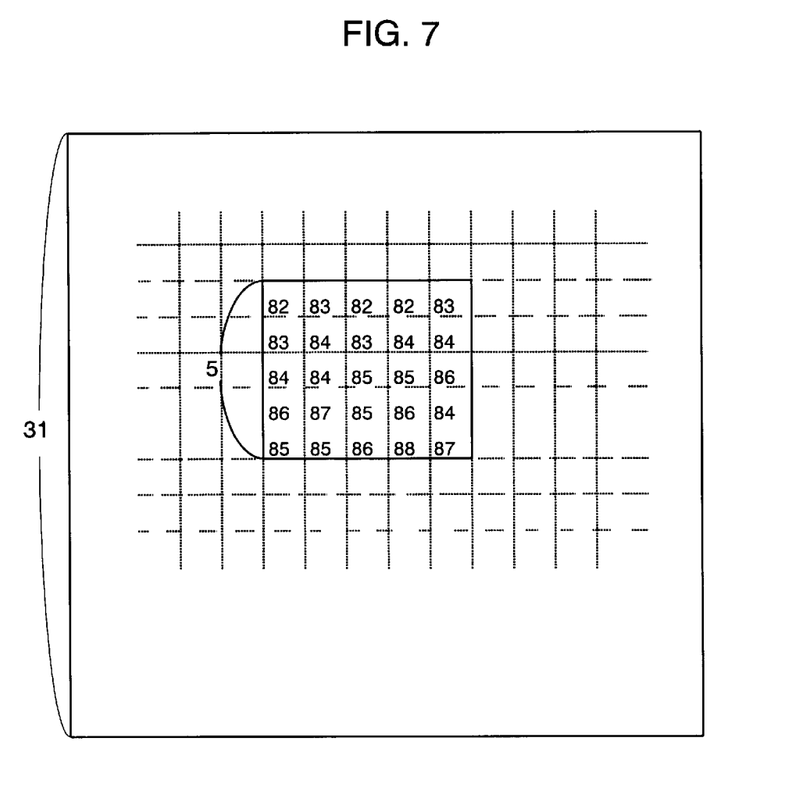
FIG. 7 is a diagram explaining the retrieval method according to the present invention.

Since the first-stage minimum predictive error value being 82 is larger than the reference predictive error value, as shown in FIG. 7, the second-stage retrieval is performed. The vector with a minimum predictive error value in the first-stage and second retrievals is defined as a motion vector.

The present invention, which has the configuration and function as described above, provides the following effects.

Since the retrieval range adaptively changes to be less than a specified value, the cycles of the block matching process can be reduced. Accordingly, the present invention can perform high-speed retrieval.

Since a new retrieval range is set by referring to the vector detected at the same location of a previous frame, a region with small motion, that is, with small vector in the previous frame provides a narrowed retrieval range. Accordingly, in the motion vector retrieval process, the region with a smaller motion enables higher speed vector retrieval to be performed.

Moreover, since the retrieval process is not cut until a constant range is retrieved, a macroblock with high correlation can be detected accurately. Accordingly, the motion vector can be detected accurately in the motion vector retrieval process.

Even when a limited retrieval range is retrieved with low correlation, motion vector can be detected accurately by retrieving a determined retrieval range. Accordingly, even if the motion changes largely, the motion vector can be accurately detected in the motion vector retrieval process.

The entire disclosure of Japanese Patent Application No. 11-298862 filed on Oct. 20, 1999 including specification, claims, drawing and summary are incorporated herein by reference in its entirety.

What is claimed is:

1. A high-speed motion retrieval device comprising:
   an compressive encoding device;
      said compression encoding device including:
         image input means for receiving an image in one frame units;
         motion vector retrieval means for obtaining a correlation between a current frame and a previous frame output from said image input means;
         inter-block differentiating means for performing a differential operation to a block at a location corresponding to a motion vector on a reference frame, said motion vector being a vector to the location where a minimum predictive error has been obtained through retrieval of said motion retrieval means;
         frequency conversion means for converting block differential data obtained by said interblock differentiating means into a frequency component;
         quantization means for quantizing said frequency component; and
         variable-length encoding means for compressively encoding a quantized output from said quantization means;
      said motion vector retrieval means including first-stage motion retrieval means and second-stage motion retrieval means;
         wherein said first-stage motion retrieval means retrieves a retrieval range to be decided by referring to a retrieval result in said previous frame, ends a motion retrieval process at the time said range has been retrieved if a predictive error is smaller than a threshold value, retrieves a region not retrieved by said first-stage motion retrieval means within a retrieval range predetermined by said second-stage motion retrieval means if the predictive error is larger than the threshold value, thus obtaining a region with a minimum predictive error, and wherein said first stage motion retrieval means performs retrieval in two steps and dynamically varies a first-stage retrieval range, thus performing motion vector retrieval with less erroneous detection at high speed.

2. The high-speed retrieval device defined claim 1, wherein said first-stage motion retrieval means retrieves a predetermined retrieval range without a special process since when image data is input to said image input means, it is decided whether or not retrieval information data can be referred to but said information cannot be retrieved at initial retrieval.

3. The high-speed retrieval device defined claim 1, wherein said threshold value comprises a retrieval result of a macroblock at the same location as that on said previous frame.

4. The high-speed retrieval device defined claim 1, wherein a retrieval range of said first-stage motion retrieval means is a square region of which each side has a length twice the motion vector length obtained in said previous frame.

5. The high-speed retrieval device defined claim 1, wherein when retrieval information can be referred to, the steps are performed of capturing information about motion vector or predictive error of a macroblock at the same location as that in said previous frame, predicting a location with a minimum predictive error by performing retrieval based on the motion vector information of said previous frame, with a retrieval start location shifted by said vector, retrieving said location with particular emphasis, and deciding a first-stage motion retrieval range based on captured vector information.

6. The high-speed retrieval device defined claim 5, wherein said retrieval range is a maximum or median value of a vector of an ambient block already retrieved within a frame, or a maximum or median value of each vector at the same location on past several frames, and wherein if the minimum value of a predictive error obtained over said retrieval range is smaller than a predictive error in a block at the same location on a previous frame, a retrieval process is ended, or if not, said retrieval process is continued.

7. The high-speed retrieval device defined claim 1, further comprising retrieval information storage means inserted between the input of said first-stage motion retrieval means and the output of said second-stage motion retrieval means, said retrieval information storage means storing a motion vector value or a minimum predictive error value, obtained by said first-stage motion retrieval means and said second motion retrieval means, for next frame motion retrieval.

8. The high-speed retrieval device defined claim 1, further comprising motion compensation means connected to said first-stage motion retrieval means and said second-stage motion retrieval means, said motion compensation means inverse-quantizing and inverse-frequency converting an output of said quantization means to convert a frequency component into an image component and then creating data about reference frame from said image component.

9. A high-speed motion retrieval method comprising the step of compressive encoding;
   said compression encoding step including the steps of:
      receiving an image in one frame units;
      performing motion vector retrieval to obtain a correlation between a current frame and a previous frame of said image;
      performing a differential operation to a block at a location corresponding to a motion vector on a reference frame, said motion vector being a vector to the location where a minimum predictive error has been obtained through said motion retrieval;
      converting block differential data obtained by said differential operation into a frequency component;
      quantizing said frequency component; and
      compressively encoding an output quantized in said quantizing step into a variable-length code;
      said motion vector retrieval step including a first-stage motion retrieval sub-step and a second-stage motion retrieval sub-step;

wherein said first-stage motion retrieval sub-step includes retrieving a retrieval range to be decided by referring to a retrieval result in said previous frame, ending a motion retrieval process at the time said range has been retrieved if a predictive error is smaller than a threshold value, retrieving a region not retrieved in said first-stage motion retrieval sub-step within a retrieval range predetermined in said second-stage motion retrieval sub-step if the predictive error is larger than the threshold value, and thus obtaining a region with a minimum predictive error, and wherein said first stage motion retrieval sub-step includes performing retrieval in two steps and dynamically varying a first-stage retrieval range, thus performing motion vector retrieval with less erroneous detection at high speed.

10. The high-speed retrieval method defined claim 9, wherein said first-stage motion retrieval sub-step includes retrieving a predetermined retrieval range without a special process since when image data is input, it is decided whether or not retrieval information data can be referred to but said information cannot be retrieved at initial retrieval.

11. The high-speed retrieval device method claim 9, wherein said threshold value comprises a retrieval result of a macroblock at the same location as that on said previous frame.

12. The high-speed retrieval method defined claim 9, wherein a retrieval range in said first-stage motion retrieval sub-step is a square region of which each side has a length twice the motion vector length obtained in said previous frame.

13. The high-speed retrieval method defined claim 9, wherein when retrieval information can be referred to, the steps are performed of capturing information about motion vector or predictive error of a macroblock at the same location as that in said previous frame, predicting a location with a minimum predictive error by performing retrieval based on the motion vector information of said previous frame, with a retrieval start location shifted by said vector, retrieving said location with particular emphasis, and deciding a first-stage motion retrieval range based on captured vector information.

14. The high-speed retrieval method defined claim 13, wherein said retrieval range is a maximum or median value of a vector of an ambient block already retrieved within a frame, or a maximum or median value of each vector at the same location on past several frames, and wherein if the minimum value of a predictive error obtained over said retrieval range is smaller than a predictive error in a block at the same location on said previous frame, a retrieval process is ended, or if not, a retrieval process is continued.

15. The high-speed retrieval method defined claim 9, further comprising the step of storing a motion vector value or a minimum predictive error value, obtained in said first-stage motion retrieval step and said second motion retrieval step, for next frame motion retrieval.

16. The high-speed retrieval method defined claim 9, further comprising the step of inverse-quantizing and inverse-frequency converting an output obtained in said quantizing step to convert a frequency component into an image component and then creating data about reference frame from said image component.

* * * * *